Feb. 5, 1963

C. E. SLOOP 3,076,953

SPACER FOR SPRING-JAW TYPE SPADE TERMINAL

Filed March 13, 1959

INVENTOR:
CLIFFORD E. SLOOP

BY

ATTORNEY

United States Patent Office 3,076,953
Patented Feb. 5, 1963

3,076,953
SPACER FOR SPRING-JAW TYPE SPADE
TERMINAL
Clifford E. Sloop, 2230 10th St., Columbus, Ga.
Filed Mar. 13, 1959, Ser. No. 799,146
6 Claims. (Cl. 339—259)

This invention relates to spring jaws for electrical meter sockets, and more particularly concerns a spacer for spring-jaw type spade terminal which will enable the current carrying spade terminals of a detachable meter to be more readily inserted in an electrical meter socket.

Meter sockets using spring-jaw type spade terminals have been in use for about thirty years. Over one hundred million sockets having such spade terminals are now in use and several million are added annually. During the past few years, however, the increase of electrical appliances in home and business establishments has called for meter sockets of increased electrical capacity, and this trend appears to be increasing annually. As the current requirement for this type of spade terminal increases, the spring force which the jaw exerts on the meter spade inserted therein increases.

While the sockets having strong spring jaws are better in every way for their purpose, the electrical capacity requirements at the present time have increased to such an extent that the force necessary to push a meter into such sockets has resulted in very serious conditions. For example, serious hand injuries often occur from glass meter covers which break while being pushed into such a socket. A plastic container is available with which a meter may be held while being forced into the socket, but such a container is quite large and cannot be carried easily. Safety gloves have also been provided to overcome this danger. Even so, personnel often become fatigued and aggravated with many installations in one day and do not use these safety devices.

Another danger has resulted from the large force necessary to position a meter in such meter sockets, namely that there is the unauthorized practice of forcing the jaws open with a large screw driver. This often results in weakening or breaking the jaws by forcing them open beyond their elastic limit. Such practice also affords the possibility of electrical shock or flash.

If the jaws have been sprung or the meter improperly installed, there may be a substantial voltage drop between a jaw and its spade. The resulting heat, on many occasions, burns out the expensive meter or causes the meter to operate improperly, usually registering less than the amount of electricity actually used. I recall one occasion where three expensive meters were installed and subsequently burned out before this defect was discovered and remedied.

The high quality performance of the spring-jaw type spade terminal has never been questioned once the spade is in the jaw. The only difficulty lies in getting the spade into the jaw, and this hardship is presently causing the utilities to utilize terminal jaws of other types, regardless of the shortcomings they have. To more fully understand the problem, it should be considered that in a conventional spring-jaw type of spade terminal the two inner faces of the contact members in the spring jaw are together in their normal position and the entering spade must urge these jaws apart to their fully open position. The first spades are usually pushed into the jaws of the socket on a customer's premises when the meter installer gives service to a customer. In so doing, all of the spades on the meter must simultaneously force open a like number of jaws, thereby multiplying the force necessary to insert a meter by the number of spades on the meter.

I have found that newly formed spring jaws behave as though they were frozen, insofar as the machine action used in their manufacture has left them in a clinched condition. The hand feel while pushing the first spade into such a spring jaw is as though the spade were being pushed through a frozen crust. When the spade finally breaks the crust and enters the jaw, it may be pushed in a second time with tremendously reduced force. The first action has set the spring at ease, so to speak, permitting it to function with its natural spring resilience.

One of the objects of this invention, therefore, is to overcome these and many other problems known to the prior art by the provision of a meter socket spring-jaw having a spacer therein which greatly reduces the force necessary to insert a spade of a meter in the jaw so as to permit use of such spring-type spade terminals of higher capacity in meter installations.

Another object of this invention is to provide a spacer for the spring-jaw terminals of a meter socket which urges both sides of the spring-jaws partially open under full open position, whereby an incoming spade need not encounter the spring tension normally present if the two sides of the spring jaws were fully closed against each other.

Another object of the present invention is to provide a spacer member which does not reduce the clamping force exerted on a spade terminal, but does reduce the force necessary to be exerted on the meter box in inserting the spades thereof into the spring jaws of the meter box.

A further object of this invention is to provide a spacer for spring-jaw type terminals which protects the jaw from being broken, abused or sprung beyond its elastic limits.

Still another object of this invention is to provide a spacer for spring-type terminals of a meter socket which indicates to the meter installer at all times that the spring jaw has been pre-sprung. With such indication being present, meter installers not only save time, but avoid the risk of electrical shock and flash, as well as the possibility of breaking the jaws when sprung by unauthorized tools.

Still another object of this invention is to provide a spacer for spring-jaw type terminals of a meter socket which permits the use of spring jaws for meter sockets of considerably greater capacity. At present, the force necessary to insert a meter in the spring-jaw type spade terminals limits the maximum capacity meter with which such jaws can be used, because beyond a certain point an installer is incapable of safely pushing the meter into the socket. The present invention enables meters to be pushed more easily into sockets having the conventional terminal jaw, and permits stronger jaws having greater current carrying capacity to be used.

Other objects, features and advantages of the present invention will become apparent from consideration of the following specification, when taken in conjunction with the accompanying drawings, wherein like characters of reference designate the same or similar parts throughout the several views, and in which.

Figure 1:
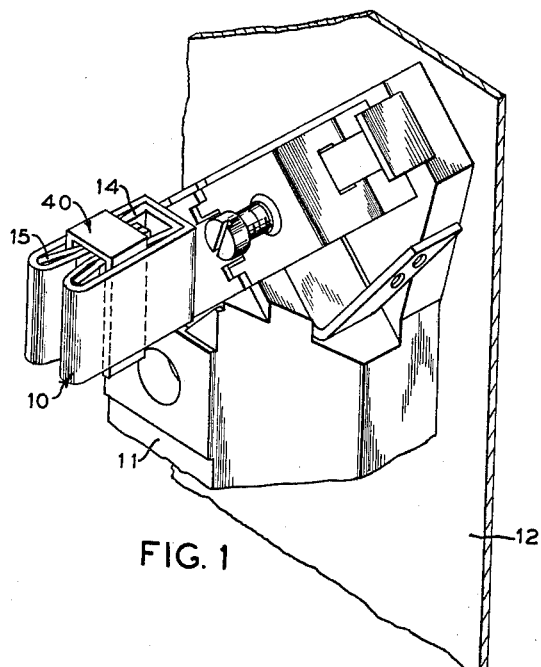
FIG. 1 is a fragmentary perspective view of a conventional terminal of a meter box having mounted thereon a spring type jaw and spacer constructed in accordance with the present invention installed on the jaw.

Referring now to the drawings, FIG. 1 shows a conventional spring-jaw type spade terminal 10 mounted on an insulator or terminal block 11 which is secured to the back wall 12 of a meter socket box. In accordance with the present invention, a spacer or spacer member is operatively inserted into the jaw terminal, as will hereinafter be described in more detail.

Figure 2:
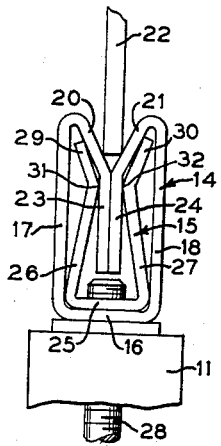
FIG. 2 is a side elevational view of a conventional spring jaw on a portion of the meter box assembly, receiving a spade of a meter.

The conventional spring-jaw type of terminal under consideration may be generally characterized as having an outer spring jaw terminal 14 and an inner spring helper member 15, as shown most clearly in FIG. 2. The outer terminal 14 is generally U-shaped, having an apertured securing web or base 16, with spaced parallel legs 17 and 18 extending normal to the base from the extremities thereof. The outer end of each leg is inwardly return-bent to form the downwardly converging flat lips 20 and 21 which act as camming members when receiving a spade 22 of a meter. Projecting downwardly from the inner ends of the lips 20 and 21 respectively are the contact members 23 and 24, the inner surfaces of which are contiguous along the vertical center line of the jaw terminal 14, being urged together by the lips 20 and 21. These contact members 23 and 24 are therefore parallel to each other and parallel to and between legs 17 and 18. The lower ends of contact members 23 and 24 terminate above base 16. When the jaws of terminal 14 are urged apart by downward movement of spade 22, the inner surfaces of contact members 23 and 24 engage the outer surfaces of spade 22, and are urged by spring force thereagainst.

The inner spring or helper member 15 is also generally U-shaped, having an apertured securing base 25 with spaced upwardly converging legs 26 and 27. The base 25 of inner spring member 15 is secured to the inside surface of the base 16 of terminal 14 by a bolt or rivet 28 which passes through the aligned apertures of each for engagement with terminal block 11. The legs 26 and 27 of inner member 15 are received between legs 17 and 18 of terminal 14 with the contact members 23 and 24 being between legs 26 and 27. The upper ends of legs 26 and 27 are provided with diverging flanges 29 and 30 which terminate below the junction of legs 17 and 18 and lips 20 and 21, respectively. The junctions 31 and 32 of flanges 29 and 30 and legs 26 and 27 act against the outer surfaces of contact members 23 and 24 to urge them inwardly, thereby increasing the clamping force of the outer jaw terminal 14.

Figure 3:
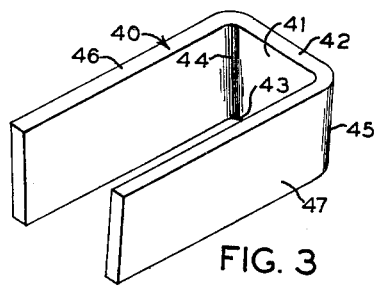
FIG. 3 is an enlarged perspective view of one form of the spacer of the present invention.
Figure 4:
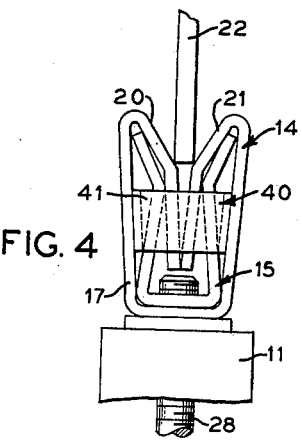
FIG. 4 is a side elevational view of the spring jaw of FIG. 2 with the spacer of FIG. 3 installed thereon.

According to the present invention, a means is provided for maintaining the contact members 23 and 24 in a partially opened condition, such as shown in FIG. 4, whereby the spade 22 may more readily penetrate the throat between contact members 23 and 24. Preferably this means includes a resilient U-shaped spacer, denoted generally by numeral 40. In the present embodiment this U-shaped spacer 40 includes a flat web 41, seen best in FIG. 3. The web 41 is generally trapezoidal in shape, having a major base 42 and a minor base 43 and a pair of tapering sides 44 and 45.

Integrally formed with base 41 are legs 46 and 47 which project from sides 44 and 45 respectively in the same direction and about normal to base 41. The outer surfaces of legs 46 and 47 taper downwardly and the leg 46 is slightly shorter than leg 47.

The distance along base 42 between the outer surfaces of legs 46 and 47 is greater than the distance between the inner surfaces of legs 17 and 18 as viewed in FIG. 2 and is slightly less than the distance between the inner surfaces of legs 17 and 18 plus the thickness of blade 22. The distance along minor base 43 between legs 46 and 47 is about equal to or only slightly greater than the distance between the inner surfaces of legs 17 and 18.

Figure 6:
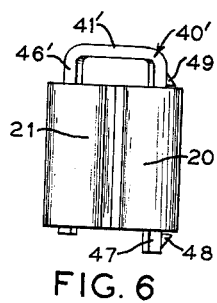
FIG. 6 is a plan view of the spring jaw of FIG. 2 with the spacer of FIG. 5 installed thereon.
Figure 5:
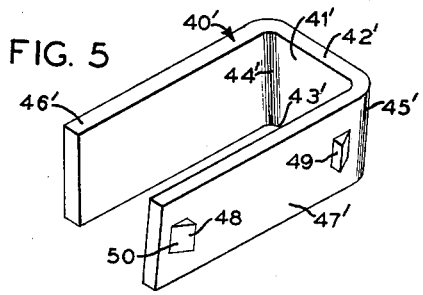
FIG. 5 is an enlarged perspective view of a modified form of the spacer of FIG. 3, the modified form having positioning fingers formed therein.

As best seen in FIGS. 5 and 6, spacer 40' has web 41', major base 42', minor base 43', sides 44', 45' and legs 46' and 47', all identical to the parts of the spacer 40. Complementary spaced positioning fingers 48 and 49 are struck outwardly from the outer surfaces of the end portions of leg 47'. The space between the inner surfaces of fingers 48 and 49 is slightly greater than the width of leg 17 and the outer surface 50 of finger 48 forms an inclined slide so that when the spacer 40' is installed, as shown in FIG. 6, the outer end of leg 47' will be urged inwardly as finger 48 slides along the inner surface of leg 17 and then springs outwardly as finger 48 reaches the other side thereof, thereby causing fingers 48 and 49 to bracket leg 17. The inner surface of finger 49 is spaced inwardly from the plane of the inner surface of web 41' so that web 41' is spaced from the adjacent sides of the jaw terminal.

When installed, the spacer 40 or 40' is inserted, legs 46 and 47 or 46' and 47' first, transversely between intermediate portions of legs 17 and 18 of jaw terminal 14, so that the outer surfaces of legs 46 and 47 or 46' and 47' lie flat against the inner surfaces of legs 17 and 18 urging them into the slightly diverging position as shown in FIG. 4. It is to be noted that the spreading of legs 17 and 18 causes a partial opening of the jaw terminal 14 whereby the throat defined by contact members 23 and 24 is generally triangular, the contact members 23 and 24 being apart about the thickness of spade 22 at their upper ends and touching each other at their lower ends.

The spacer 40 is preferably installed in a horizontal jaw terminal 14 such as shown in FIG. 1 so that the spacer 40 will be urged by gravity into the position shown in FIG. 1, even though the spade 22 be installed in the jaw terminal 14. Of course when the spade 22 is not in place between contact members 23 and 24, the spacer 40 is held by the spring force of the legs 17 and 18.

Spacer 40' may, however, be installed in any position since the fingers 48 and 49 position the spacer 40' with respect to leg 17.

It will therefore be seen that, with my spacer 40 or 40', the jaws of terminal 14 are maintained in tension in a partially opened condition at all times. The legs, however, are not sufficiently open that the jaw terminal 14 is urged beyond its elastic limits. Nor are the legs 17 and 18 held sufficiently wide apart that any appreciable pressure by the jaw terminal 14 against the spade 22, when inserted, will be relieved.

It will be obvious to those skilled in the art that many variations may be made in the embodiments chosen for purpose of illustrating the present invention without departing from the scope of my invention as defined by the appended claims.

I claim:

1. In an electrical contact jaw of the type having a transverse base, a pair of outer legs extending longitudinally from said base, the ends of said base being integrally joined to the inner ends of said legs, reverse bends at the outer ends of said legs, inwardly converging flat lips transversely aligned with said outer legs and connected by their outer ends to said reverse bends, opposed flat contact members carried by said lips within the confines of said outer legs, the outer ends of said contact members being connected to the inner ends of said lips, said contact members being spaced inwardly from said outer legs, said outer legs being biased inwardly sufficiently that, with the outer legs a normal distance apart, a substantial portion of the inner surfaces of said contact members are contiguous with each other so as to apply a maximum clamping force against a spade when inserted therebetween, the combination therewith of a spacer member including a web extending transversely of said contact jaw, and spaced spacer legs projecting from said web, the outer surfaces of said spacer legs respectively engaging, when said contact members are empty, the inner surfaces of said outer legs at positions spaced from said base, the distance between said outer surfaces of said spacer legs being greater than the normal distance between the inner surfaces of said outer legs at their positions of engagement, said distance between the outer surfaces of said spacer legs being sufficient, when said contact members are empty, to hold said outer legs apart sufficiently for said outer legs to hold said inner legs opened by an amount such that said spade may be inserted therein with a minimal travel of said jaw to receive said maximum clamping force of said contact members, and being insufficient to continue such holding action when said spade is received therein.

2. The structure defined in claim 1 wherein said outer legs diverge from said base at least when said spade is inserted between said contact members and wherein said spacer member is positionable in a plurality of positions along said outer legs.

3. In an electrical contact jaw of the type having a U-shaped terminal provided with a base and a pair of spaced opposed legs extending from said base, opposed contact members carried by said legs, said contact members being spaced inwardly from said legs, said legs being normally biased inwardly so that said contact members are adapted to apply a maximum clamping force against a spade inverted between contact members, the combination therewith of a separate rigid spacer member extending between said outer legs and having outer surfaces for engaging, when said contact members are empty, the inner surfaces of said outer legs, the distance between said outer surfaces of said spacer member being greater than the normal distance between the inner surfaces of said outer legs at their positions of engagement, said distance between the outer surfaces of said spacer member being sufficient when said contact members are empty to hold said contact members open by an amount such that said spade may be inserted therein with a minimal travel of said jaw to receive said maximum clamping force of said contact members, and being insufficient to continue such holding action when said spade is received therein.

4. In a heavy duty spring-type electrical contact jaw having opposed contact members which are biased by said jaw inwardly toward each other into a closed position and are adapted to be moved from said closed position outwardly into an open position by the insertion of a flat removable spade between said contact members, said jaw applying a large clamping force through said contact members against the opposite flat sides of said spade when said spade is received between said contact members, the bias of said jaw urging said contact members toward each other whereby said contact members are adapted to travel to said closed position each time said spade is removed from between said contact members, the combination therewith of a separate rigid spacer member carried by said contact jaw, said spacer member being readily insertible in said contact jaw when said contact members are opened to said open position and being firmly clamped by said jaw upon a minimal amount of movement of said jaw toward its closed position, said spacer member being sufficiently rigid that when clamped by said jaw, said spacer member holds said contact members in a position between said closed position and said open position when said spade is removed from between said contact members and so that upon reinsertion of said spade, said spacer members are moved outwardly by said minimal amount and said jaw is again essentially free of any holding action by said spacer member.

5. In a heavy duty electrical spring-type jaw having a U-shaped terminal provided with a transverse base and a pair of legs extending longitudinally from the ends of said base, reverse bends at the outer ends of said legs, inwardly converging lips connected by their outer ends to said reverse bends, opposed contact members carried by the inner ends of said lips within the confines of said legs, the inner ends of said contact members terminating in spaced relationship with respect to said base, said contact members having flat inner surfaces, said contact members being spaced inwardly from said legs to define openings between said legs and their respective associated contact members, said contact members being biased inwardly toward a closed position of said legs, said legs and said contact members being movable outwardly to an open position upon the insertion of a flat sided spade in a longitudinal direction against said lips and toward said base, said spade resting between said contact members when fully inserted within said jaw, the bias of said legs being such as to apply maximum clamping force by the flat inner surfaces of said contact members against the flat sides of said spade when said spade is received therebetween, said contact members being returnable by said bias toward their closed position upon removal of said spade from between said contact members, the combination therewith of a separate, rigid U-shaped spacer member carried by said legs of said terminal and having a web and a pair of opposed spacer legs projecting from said web, said opposed spacer legs being respectively positioned in said openings between said legs of said terminal and said contact members, said web extending transversely across the sides of said contact members outwardly of the inner ends of said contact members, the space between the outer surfaces of said spacer legs being such that, when said spade is removed from between contact members, said legs of said terminal move inwardly and engage the outer surfaces of said spacer legs so that said spacer legs hold said contact members open by an amount such that a spade may be inserted between said contact members with a minimal outward movement of said legs of said terminal to receive said maximum clamping force of said contact members.

6. In a heavy duty electrical spring-type jaw having a U-shaped terminal provided with a transverse base and a pair of legs extending longitudinally from the ends of said base, reverse bends at the outer ends of said legs, inwardly converging lips connected by their outer ends to said reverse bends, opposed contact members carried by the inner ends of said lips within the confines of said legs, the inner ends of said contact members terminating in spaced relationship with respect to said base, said contact members having flat inner surfaces, said contact members being spaced inwardly from said legs to define openings between said legs and their respective associated contact members, said contact members being biased inwardly toward a closed position by said legs, said legs and said contact members being movable outwardly to an open position upon the insertion of a flat sided spade in a longitudinal direction against said lips and toward said base, said spade resting between said contact members when fully inserted within said jaw, the bias of said legs being such as to apply maximum clamping force by the flat inner surfaces of said contact members against the flat sides of said spade when said spade is received therebetween, said contact members being returnable by said bias toward their closed position upon removal of said spade from between said contact members, the combination therewith of a separate, rigid U-shaped spacer member carried by said legs of said terminal and having a web and a pair of opposed spacer legs projecting from said web, said opposed spacer legs being respectively positioned in said openings between said legs of said terminal and said contact members, said web extending transversely across the sides of said contact members outwardly of the inner ends of said contact members, the space between the outer surfaces of said spacer legs being such that, when said spade is removed from between said contact members, said legs of said terminal will move inwardly and engage the outer surfaces of said spacer legs so that said spacer legs hold said contact members opened by an amount such that a spade may be inserted between said contact members with a minimal outward movement of said legs of said terminal to receive said maximum clamping force of said contact members, and means protruding from said spacer legs for engaging said legs of said terminal to fix the position of said spacer member on said terminal.

References Cited in the file of this patent

UNITED STATES PATENTS

| | | |
|---|---|---|
| 1,969,991 | Robinson | Aug. 14, 1934 |
| 2,174,682 | Beggs | Oct. 3, 1939 |
| 2,665,415 | Kojis | Jan. 5, 1954 |
| 2,711,523 | Willis | June 21, 1955 |

FOREIGN PATENTS

| | | |
|---|---|---|
| 883,777 | Germany | July 20, 1953 |